United States Patent
Tseng et al.

(10) Patent No.: US 12,486,439 B2
(45) Date of Patent: Dec. 2, 2025

(54) URETHANE RESIN COMPOSITION, ADHESIVE, AND SYNTHETIC LEATHER

(71) Applicant: DIC Corporation, Tokyo (JP)

(72) Inventors: Yayi Tseng, Osaka (JP); Ryo Maeda, Osaka (JP)

(73) Assignee: DIC Corporation, Tokyo (JP)

( * ) Notice: Subject to any disclaimer, the term of this patent is extended or adjusted under 35 U.S.C. 154(b) by 284 days.

(21) Appl. No.: 17/773,017

(22) PCT Filed: Sep. 17, 2020

(86) PCT No.: PCT/JP2020/035179
§ 371 (c)(1),
(2) Date: Apr. 28, 2022

(87) PCT Pub. No.: WO2021/084955
PCT Pub. Date: May 6, 2021

(65) Prior Publication Data
US 2022/0389293 A1  Dec. 8, 2022

(30) Foreign Application Priority Data
Oct. 28, 2019 (JP) .................. 2019-195231

(51) Int. Cl.
| | | |
|---|---|---|
| *C09J 175/12* | (2006.01) | |
| *C08G 18/12* | (2006.01) | |
| *C08G 18/22* | (2006.01) | |
| *C08G 18/32* | (2006.01) | |
| *C08G 18/44* | (2006.01) | |
| *C08G 18/66* | (2006.01) | |
| *C08G 18/75* | (2006.01) | |

(52) U.S. Cl.
CPC ............ *C09J 175/12* (2013.01); *C08G 18/12* (2013.01); *C08G 18/227* (2013.01); *C08G 18/3271* (2013.01); *C08G 18/44* (2013.01); *C08G 18/6655* (2013.01); *C08G 18/755* (2013.01)

(58) Field of Classification Search
CPC ...... C09J 175/12; C09J 175/06; C09J 175/04; C08G 18/12; C08G 18/227; C08G 18/3271; C08G 18/44; C08G 18/6655; C08G 18/755; C08G 2170/80; C08G 18/10; C08G 18/3275; C08G 18/0823; C08G 18/3234; C08G 18/6659; C08G 18/348; C08G 18/6614; D06N 2211/28; D06N 3/146; D06N 3/14; C08L 75/06
USPC ........................................... 442/149; 428/904
See application file for complete search history.

(56) References Cited

U.S. PATENT DOCUMENTS

| | | | |
|---|---|---|---|
| 2012/0238701 A1 | 9/2012 | Yamada et al. | |
| 2014/0212676 A1* | 7/2014 | Tetsui | C08G 18/758 156/289 |
| 2019/0352524 A1 | 11/2019 | Yatake | |

FOREIGN PATENT DOCUMENTS

| | | | |
|---|---|---|---|
| CN | 103764899 | 4/2014 | |
| CN | 108291000 | 7/2018 | |
| EP | 3398980 | 11/2018 | |
| EP | 3398980 B1 * | 12/2020 | ............ C08G 18/00 |
| JP | 2013227528 | 11/2013 | |
| JP | 2014001475 | 1/2014 | |
| JP | 2016188362 | 11/2016 | |
| JP | 2016222921 | 12/2016 | |
| JP | 2018123255 | 8/2018 | |
| JP | 2019081826 | 5/2019 | |
| JP | 2020083902 | 6/2020 | |
| JP | 2020105243 | 7/2020 | |
| WO | 2013027489 | 2/2013 | |
| WO | 2016047415 | 3/2016 | |

OTHER PUBLICATIONS

International Search Report (Form PCT/ISA/210) of PCT/JP2020/035179, mailed on Dec. 8, 2020, with English translation thereof, pp. 1-6.

* cited by examiner

*Primary Examiner* — Matthew D Matzek
(74) *Attorney, Agent, or Firm* — JCIPRNET

(57) ABSTRACT

A urethane resin composition including water, the urethane resin composition being produced using a biomass raw material and having high oleic-acid resistance, excellent low-temperature flexibility, and high peel strength. A urethane resin composition including an anionic urethane resin (X) and water (Y), in which the anionic urethane resin (X) is produced using a polyol (a) including a biomass-derived polycarbonate polyol (a1), a polyisocyanate (b), and an alkanolamine (c), as essential raw materials. Furthermore, An adhesive including the urethane resin composition and a synthetic leather having an adhesive layer formed from the adhesive.

5 Claims, No Drawings

URETHANE RESIN COMPOSITION, ADHESIVE, AND SYNTHETIC LEATHER

CROSS-REFERENCE TO RELATED APPLICATION

This application is a 371 application of the international PCT application serial no. PCT/JP2020/035179, filed on Sep. 17, 2020, which claims the priority benefit of Japan application no. 2019-195231, filed on Oct. 28, 2019. The entirety of each of the above-mentioned patent applications is hereby incorporated by reference herein and made a part of this specification.

TECHNICAL FIELD

The present invention relates to a urethane resin composition, an adhesive, and a synthetic leather.

BACKGROUND ART

Urethane resin compositions in which a urethane resin is dispersed in water can reduce environmental loads better than conventional organic solvent-based urethane resin compositions, and therefore, have recently started to be suitably used as materials for manufacturing synthetic leather (including artificial leather), gloves, coating agents for curtain, sheets, and the like. Furthermore, in recent years, against the backdrop of global warming and depletion of petroleum resources, global demand for biomass raw materials, such as plants, has been increasing to reduce the amount of usage of fossil resources, such as petroleum.

High durability is required of the urethane resin compositions, in particular, when the urethane resin compositions are used for synthetic leather used as interior materials for vehicles. Evaluation items of this durability are manifold, examples of which include heat resistance, moist heat resistance, light resistance, chemical resistance, and wear resistance (for example, see PTL 1). Of these evaluation items, resistance to oleic acid contained in sebum is strongly required because synthetic leather frequently comes into contact with the human body. However, it has been pointed out that aqueous urethane resins are inferior in oleic acid resistance to solvent-based urethane resins.

Furthermore, in recent years, with uses in cold climate regions in mind, the level of requirement for flexibility at low temperature is increasing.

CITATION LIST

Patent Literature

PTL 1: Japanese Unexamined Patent Application Publication No. 2016-222921

SUMMARY OF INVENTION

Technical Problem

The present invention provides a urethane resin composition including water, the urethane resin composition being produced using a biomass raw material and having high oleic-acid resistance, excellent low-temperature flexibility, and high peel strength.

Solution to Problem

Solution to Problem

The present invention provides a urethane resin composition including an anionic urethane resin (X) and water (Y), in which the anionic urethane resin (X) is produced using a polyol (a) including a biomass-derived polycarbonate polyol (a1), a polyisocyanate (b), and an alkanolamine (c), as essential raw materials.

Furthermore, the present invention provides an adhesive including the urethane resin composition and provides a synthetic leather having an adhesive layer formed from the adhesive.

Advantageous Effects of Invention

The urethane resin composition according to the present invention includes water, and furthermore is produced using a biomass-derived raw material, hence is an environment-responsive material. Furthermore, the urethane resin composition according to the present invention is capable of forming a coating having high oleic-acid resistance, excellent low-temperature flexibility, and high peel strength. Hence, the urethane resin composition according to the present invention can be suitably used as a material for synthetic leather. In particular, the urethane resin composition can be suitably used as a material for forming an adhesive layer.

DESCRIPTION OF EMBODIMENTS

The urethane resin composition according to the present invention includes: an anionic urethane resin (X) produced using a specific essential raw material; and water (Y).

To achieve high oleic-acid resistance, excellent low-temperature flexibility, and high peel strength, the anionic urethane resin (X) is produced using a polyol (a) including a biomass-derived polycarbonate polyol (a1), a polyisocyanate (b), and an alkanolamine (c), as essential raw materials.

The biomass-derived polycarbonate polyol (a1) is an essential component especially for achieving excellent oleic acid resistance and low-temperature flexibility.

As the polycarbonate polyol (a1), a reaction product of carbonate and/or phosgene with a glycol compound including biomass-derived glycol can be used. Specific examples of the polycarbonate polyol (a1) that can be used include polycarbonate polyols described in Japanese Unexamined Patent Application Publication No. 2018-127758, Japanese Unexamined Patent Application Publication No. 2017-133024, and Japanese Unexamined Patent Application Publication No. 2011-225863. These polycarbonate polyols may be used alone or in combination of two or more.

As the polycarbonate polyol (a1), among the above-mentioned polycarbonate polyols, a polycarbonate polyol produced using, as a raw material, biomass-derived decanediol serving as the glycol compound is preferably used, and a polycarbonate polyol produced using, as a raw material, biomass-derived 1,10-decanediol serving as the glycol compound is more preferably used from the viewpoints of achieving higher oleic-acid resistance and more excellent low-temperature flexibility.

From the viewpoints of achieving higher oleic-acid resistance and more excellent low-temperature flexibility, additionally, butanediol is preferably used, 1,4-butanediol is more preferably used as the glycol compound.

In the case where the biomass-derived decanediol and the butanediol are used in combination, the total amount of the biomass-derived decanediol and the butanediol used in the glycol compound is preferably 50 mol % or more, more preferably 70 mol % or more, and still more preferably 80 mol % or more.

In the case where the biomass-derived decanediol (C10) and the butanediol (C4) are used in combination, the molar ratio [(C4)/(C10)] is preferably within a range of 5/95 to 95/5, more preferably within a range of 50/50 to 98/2, and still more preferably within a range of 75/25 to 95/5, from the viewpoints of achieving higher oleic-acid resistance and more excellent low-temperature flexibility.

From the viewpoints of achieving higher oleic-acid resistance, more excellent low-temperature flexibility, and higher peel strength, the number average molecular weight of the polycarbonate polyol (a1) is preferably within a range of 500 to 100,000, more preferably within a range of 1,000 to 3,000, and still more preferably within a range of 1,500 to 2,500. Note that the number average molecular weight of the polycarbonate polyol (a1) is a value determined by gel permeation chromatography (GPC).

Preferable examples of the polycarbonate polyol (a1) that are commercially available include "BENEBiOL NL-2010DB", manufactured by Mitsubishi Chemical Corporation.

In the polyol (a), besides the polycarbonate polyol (a1), other polyols may be used, if necessary. The content of the polycarbonate polyol (a1) in the polyol (a) is preferably 50% by mass or more, more preferably 70% by mass or more, and still more preferably 80% by mass or more.

Examples of the other polyols that can be used include polycarbonate polyols other than the polycarbonate polyol (a1), polyester polyols, polyether polyols, and polyacrylic polyols. These polyols may be used alone or in combination of two or more.

Examples of the polyisocyanate (b) that can be used include: aliphatic polyisocyanates, such as hexamethylene diisocyanate and lysine diisocyanate; alicyclic polyisocyanates, such as cyclohexane diisocyanate, isophorone diisocyanate, dicyclohexylmethane diisocyanate, tetramethylxylylene diisocyanate, and norbornene diisocyanate; and aromatic polyisocyanates, such as phenylene diisocyanate, toluene diisocyanate, diphenylmethane diisocyanate, xylylene diisocyanate, naphthalene diisocyanate, polymethylene polyphenyl polyisocyanate, and carbodiimidated diphenylmethane polyisocyanate. These polyisocyanates may be used alone or in combination of two or more.

Among the above-mentioned polyisocyanates, aliphatic polyisocyanates and/or alicyclic polyisocyanates are preferably used, and alicyclic polyisocyanates are more preferably used as the polyisocyanate (b) from the viewpoints of achieving higher oleic-acid resistance, more excellent low-temperature flexibility, higher peel strength, and higher light resistance.

The amount of the polyisocyanate (b) used is preferably within a range of 2.5% to 5.0% by mass, and more preferably within a range of 3.0% to 4.0% by mass, based on the total mass of the raw materials constituting the anionic urethane resin (X).

The alkanolamine (c) is an essential component for achieving high peel strength. The alkanolamine has an amino group having higher reactivity with an isocyanate group derived from the polyisocyanate (b) and has a hydroxyl group having lower reactivity with the isocyanate group than the amino group. Hence, the alkanolamine (c) functions not only as a chain extender for producing the urethane resin (X) (the chain extender contributing to the achievement of higher molecular weight and the formation of a hard segment), but also as a stopper. Thus, not only a good hard segment can be formed, but also the molecular weight of the urethane resin (X) can be controlled, so that both high peel strength and high oleic-acid resistance and low-temperature flexibility can be achieved.

Examples of the alkanolamine (c) that can be used include: primary alkanolamines, such as monoethanolamine and monoisopropanolamine; secondary alkanolamines, such as diethanolamine, diisopropanolamine, di-2-hydroxybutylamine, N-methylethanolamine, N-ethylethanolamine, and N-benzylethanolamine; and tertiary alkanolamines, such as triethanolamine and tripropanolamine. These alkanolamines may be used alone or in combination of two or more. Among these alkanolamines, primary alkanolamines and/or secondary alkanolamines are preferably used from the viewpoints of achieving higher oleic-acid resistance, more excellent low-temperature flexibility, and higher peel strength.

The amount of the alkanolamine (c) used is preferably within a range of 0.1% to 0.95% by mass, and more preferably within a range of 0.7% to 0.9% by mass, based on the total mass of the raw materials constituting the anionic urethane resin (X).

Specific examples of the anionic urethane resin (X) that can be used in the present invention include a reaction product of the polyol (a), the polyisocyanate (b), the alkanolamine (c), an anionic group-containing compound (d), and, if necessary, a chain extender (e).

Examples of the anionic group-containing compound (d) that can be used include: carboxyl group-containing compounds, such as 2,2-dimethylolpropionic acid, 2,2-dimethylolbutanoic acid, 2,2-dimethylolbutyric acid, 2,2-dimethylolpropionic acid, and 2,2-dimethylolvaleric acid; and sulfonyl group-containing compounds, such as 3,4-diaminobutanesulfonic acid, 3,6-diamino-2-toluenesulfonic acid, 2,6-diaminobenzenesulfonic acid, N-(2-aminoethyl)-2-aminosulfonic acid, N-(2-aminoethyl)-2-aminoethylsulfonic acid, N-2-aminoethane-2-aminosulfonic acid, and N-(2-aminoethyl)-β-alanine, and salts thereof. These compounds may be used alone or in combination of two or more.

The amount of the anionic group-containing compound (d) used is preferably within a range of 0.2% to 0.95% by mass, and more preferably within a range of 0.2% to 0.5% by mass, based on the total mass of the raw materials constituting the anionic urethane resin (X).

The chain extender (e) preferably has a molecular weight of less than 500, and more preferably has a molecular weight within a range of 50 to 450. Examples of the chain extender (e) that can be used include: a chain extender (e1) having two or more amino groups, such as ethylenediamine, 1,2-propanediamine, 1,6-hexamethylenediamine, 2,5-dimethylpiperazine, isophoronediamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, 1,4-cyclohexanediamine, piperazine, and hydrazine; and a chain extender (e2) having two or more hydroxyl groups, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerin, sorbitol, bisphenol A, 4,4'-dihydroxydiphenyl, 4,4'-dihydroxydiphenyl ether, and trimethylolpropane. These chain extenders may be used alone or in combination of two or more. Note that the molecular weight of the chain extender (e) is a chemical formula weight calculated from a chemical formula.

From the viewpoints of achieving more excellent low-temperature flexibility and higher peel strength, among the above-mentioned chain extenders, a chain extender that is produced using the chain extender (e1) having two or more amino groups as a raw material and not using the chain extender (e2) having two or more hydroxyl groups as a raw material is preferably employed as the chain extender (e). As the chain extender (e1), piperazine and/or hydrazine are preferable.

In the case of using the chain extender (e1), the equivalent ratio [(c)/(e1)] of the alkanolamine (c) to the chain extender (e1) is preferably within a range of 50/50 to 99/1, more preferably within a range of 80/20 to 97/3, and still more preferably within a range of 85/15 to 95/5 from the viewpoints of more excellent low-temperature flexibility and higher peel strength.

The amount of the chain extender (e) used is preferably within a range of 0.001% to 0.1% by mass, and more preferably within a range of 0.01% to 0.050% by mass, based on the total mass of the raw materials constituting the anionic urethane resin (X).

Examples of a method for producing the anionic urethane resin (X) include: a method in which the polyol (a) as a raw material, the polyisocyanate (b), the alkanolamine (c), the anionic group-containing compound (d), and, if necessary, the chain extender (e) are mixed at once and allowed to react; and a method in which the polyol (a), the polyisocyanate (b), and the anionic group-containing compound (d) are allowed to react, thereby obtaining a urethane prepolymer having an isocyanate group, and subsequently the urethane prepolymer and the alkanolamine (c) are allowed to react with the chain extender (e). Of these methods, the latter method is preferably employed from the viewpoint of ease of reaction control.

Each of the above-mentioned reactions is performed, for example, at a temperature of 50° C. to 100° C. for 30 minutes to 10 hours.

When the anionic urethane resin (X) is produced, an organic solvent may be used. Examples of the organic solvent that can be used include: ketone compounds, such as acetone and methyl ethyl ketone; ether compounds, such as tetrahydrofuran and dioxane; acetate compounds, such as ethyl acetate and butyl acetate; nitrile compounds, such as acetonitrile; and amide compounds, such as dimethylformamide and N-methylpyrrolidone. These organic solvents may be used alone or in combination of two or more. Note that the organic solvent is preferably removed in the end, for example, by a distillation method.

From the viewpoint of achieving higher peel strength, the weight-average molecular weight of the anionic urethane resin (X) is preferably within a range of 15,000 to 70,000, and more preferably within a range of 15,000 to 35,000. Note that the weight-average molecular weight of the anionic urethane resin (X) is a value determined by GPC.

The content of the urethane resin (X) in the urethane resin composition is, for example, within a range of 10% to 60% by mass.

Examples of the water (Y) that can be used include ion-exchanged water and distilled water. These types of water may be used alone or in combination of two or more. The content of the water (Y) is, for example, within a range of 35% to 85% by mass.

The urethane resin composition according to the present invention includes the anionic urethane resin (X) and the water (Y), and may further include other additives, if necessary.

Examples of the other additives that can be used include a neutralizer, an emulsifier, a cross-linking agent, a thickener, a urethanization catalyst, a filler, a foaming agent, a pigment, a dye, an oil repellent, a hollow foam, a flame retardant, a defoaming agent, a leveling agent, and an anti-blocking agent. These additives may be used alone or in a combination of two or more.

Furthermore, the acid value of the anionic urethane resin (X) is preferably 35 mgKOH/g or less, and more preferably within a range of 1 mgKOH/g to 20 mgKOH/g from the viewpoints of achieving higher hydrolysis resistance, higher oleic-acid resistance, more excellent low-temperature flexibility, and higher peel strength. The acid value of the anionic urethane resin (X) can be adjusted using the amount of the anionic group-containing compound (d) used as a raw material. Note that a method for measuring the acid value of the anionic urethane resin (X) will be described later in Examples.

As described above, the urethane resin composition according to the present invention includes water, and furthermore is produced using a biomass-derived raw material, hence is an environment-responsive material. Furthermore, the urethane resin composition according to the present invention is capable of forming a coating having high oleic-acid resistance, excellent low-temperature flexibility, and high peel strength. Hence, the urethane resin composition according to the present invention can be suitably used as a material for synthetic leather. In particular, the urethane resin composition can be suitably used as a material for forming an adhesive layer.

Next, a synthetic leather in which the urethane resin composition according to the present invention is used as a material for an adhesive layer will be described.

Examples of the synthetic leather include a synthetic leather including at least a base fabric, an adhesive layer, and other layers.

Examples of the base fabric that can be used include: a plastic substrate; and a fibrous substrate, such as nonwoven fabrics, woven fabrics, and knitted fabrics. Of these substrates, the fibrous substrate is preferably used from the viewpoint of achieving good softness. Examples of a material constituting the fibrous substrate that can be used include polyester fibers, nylon fibers, acrylic fibers, acetate fibers, rayon fibers, polylactic acid fibers, cotton, hemp, silk, wool, and fiber mixtures thereof.

The adhesive layer is formed from the urethane resin composition according to the present invention and has a thickness within a range of, for example, 5 μm to 100 μm.

Examples of the other layers include a wet porous layer, an intermediate layer, a skin layer, and a surface-treated layer. These layers can be used alone or in combination of two or more. With the adhesive layer, a synthetic leather having satisfactory adhesive properties can be achieved. Well-known materials can be used as materials constituting the other layers.

EXAMPLES

Hereinafter, the present invention will be described in more detail by way of Examples.

Example 1

A four-neck flask equipped with a stirrer, a reflux condenser, a thermometer, and a nitrogen gas introduction tube was charged, under a nitrogen flow, with 300 parts by mass of a polycarbonate polyol ("BENEBiOL NL-2010DB" manufactured by Mitsubishi Chemical Corporation, produced using 1,4-butanediol and biomass-derived 1,10-decanediol as raw materials, number average molecular weight: 2,000, hereinafter abbreviated as "Bio-PC"), 380 parts by mass of methyl ethyl ketone (hereinafter abbreviated as "MEK"), and 9.2 parts by mass of 2,2-dimethylolpropionic acid (hereinafter abbreviated as "DMPA"). The mixture was sufficiently stirred and mixed. Then, 68 parts by mass of isophorone diisocyanate (hereinafter abbreviated as "IPDI") was added to the mixture, and subsequently 0.1 part by mass of bismuth carboxylate was added thereto. The resultant mixture was allowed to react at 75° C. for 4 hours, whereby a MEK solution of a urethane prepolymer having an isocyanate group was obtained.

Subsequently, 8.4 parts by mass of triethylamine was added to the obtained MEK solution of the urethane prepolymer to neutralize a carboxyl group in the urethane prepolymer. After the completion of the neutralization, 690 parts by mass of ion-exchanged water was added, and then 0.76 part by mass of piperazine (hereinafter abbreviated as "PiP") and 8.3 parts by mass of monoethanolamine (hereinafter abbreviated as "MEA") were added, and the resultant mixture was allowed to react. After the completion of the reaction, MEK was removed by evaporation under reduced pressure, whereby a composition of urethane resin (X-1) was obtained. The obtained urethane resin (X-1) had an acid value of 10.3 mgKOH/g and a weight-average molecular weight of 30,000.

Example 2

A composition of urethane resin (X-2) was obtained in the same manner as in Example 1, except that diethanolamine (hereinafter abbreviated as "DEA") was used in place of MEA. The obtained urethane resin (X-2) had an acid value of 10.3 mgKOH/g and a weight-average molecular weight of 25,000.

Example 3

A four-neck flask equipped with a stirrer, a reflux condenser, a thermometer, and a nitrogen gas introduction tube was charged, under a nitrogen flow, with 300 parts by mass of the Bio-PC, 360 parts by mass of MEK, and 3.0 parts by mass of DMPA. The mixture was sufficiently stirred and mixed. Then, 54 parts by mass of IPDI was added to the mixture, and subsequently 0.1 part by mass of bismuth carboxylate was added thereto. The resultant mixture was allowed to react at 75° C. for 4 hours, whereby a MEK solution of a urethane prepolymer having an isocyanate group was obtained.

Subsequently, 2.8 parts by mass of triethylamine was added to the obtained MEK solution of the urethane prepolymer to neutralize a carboxyl group in the urethane prepolymer. After the completion of the neutralization, 620 parts by mass of ion-exchanged water was added, and then 0.63 part by mass of PiP and 6.69 parts by mass of MEA were added, and the resultant mixture was allowed to react. After the completion of the reaction, MEK was removed by evaporation under reduced pressure, whereby a composition of urethane resin (X-3) was obtained. The obtained urethane resin (X-3) had an acid value of 3.6 mgKOH/g and a weight-average molecular weight of 35,000.

Example 4

A composition of urethane resin (X-4) was obtained in the same manner as in Example 3, except that DEA was used in place of MEA. The obtained urethane resin (X-4) had an acid value of 3.6 mgKOH/g and a weight-average molecular weight of 35,000.

Comparative Example 1

A four-neck flask equipped with a stirrer, a reflux condenser, a thermometer, and a nitrogen gas introduction tube was charged, under a nitrogen flow, with 300 parts by mass of the Bio-PC, 400 parts by mass of MEK, and 16 parts by mass of DMPA. The mixture was sufficiently stirred and mixed. Then, 83 parts by mass of IPDI was added to the mixture, and subsequently 0.1 part by mass of bismuth carboxylate was added thereto. The resultant mixture was allowed to react at 75° C. for 4 hours, whereby a MEK solution of a urethane prepolymer having an isocyanate group was obtained.

Subsequently, 14.3 parts by mass of triethylamine was added to the obtained MEK solution of the urethane prepolymer to neutralize a carboxyl group in the urethane prepolymer. After the completion of the neutralization, 630 parts by mass of ion-exchanged water was added, and then 6.42 parts by mass of PiP was added, and the resultant mixture was allowed to react. After the completion of the reaction, MEK was removed by evaporation under reduced pressure, whereby a composition of urethane resin (XR-1) was obtained. The obtained urethane resin (XR-1) had an acid value of 10.3 mgKOH/g and a weight-average molecular weight of 150,000.

Comparative Example 2

A four-neck flask equipped with a stirrer, a reflux condenser, a thermometer, and a nitrogen gas introduction tube was charged, under a nitrogen flow, with 300 parts by mass of a polycarbonate polyol ("ETERNACOLL UH-2000", manufactured by Ube Industries, Ltd., non-biomass, number average molecular weight: 2,000, hereinafter abbreviated as "Non-Bio-PC (1)"), 380 parts by mass of MEK, and 3.0 parts by mass of DMPA. The mixture was sufficiently stirred and mixed. Then, 68 parts by mass of IPDI was added to the mixture, and subsequently 0.1 part by mass of bismuth carboxylate was added thereto. The resultant mixture was allowed to react at 75° C. for 4 hours, whereby a MEK solution of a urethane prepolymer having an isocyanate group was obtained.

Subsequently, 8.4 parts by mass of triethylamine was added to the obtained MEK solution of the urethane prepolymer to neutralize a carboxyl group in the urethane prepolymer. After the completion of the neutralization, 690 parts by mass of ion-exchanged water was added, and then 8.0 parts by mass of MEA was added, and the resultant mixture was allowed to react. After the completion of the reaction, MEK was removed by evaporation under reduced pressure, whereby a composition of urethane resin (XR-2) was obtained. The obtained urethane resin (XR-2) had an acid value of 10.3 mgKOH/g and a weight-average molecular weight of 70,000.

Comparative Example 3

A composition of urethane resin (XR-3) was obtained in the same manner as in Comparative Example 2, except that a polycarbonate polyol (non-biomass, number average molecular weight: 2,000, hereinafter abbreviated as "Non-Bio-PC (2)") was used in place of the Non-Bio-PC (1). The obtained urethane resin (XR-3) had an acid value of 9.2 mgKOH/g and a weight-average molecular weight of 110,000.

[Method for Measuring Number Average Molecular Weight and Weight-Average Molecular Weight]

The number average molecular weight of each of the polyols and other materials and the weight-average molecular weight of each of the anionic urethane resins (X) that are used in Examples and Comparative Examples are values determined by GPC under the following conditions.

Measurement Device: High performance GPC ("HLC-8220GPC", manufactured by Tosoh Corporation)

Columns: The following columns manufactured by Tosoh Corporation were connected in series and used.
"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1
Detector: RI (differential refractometer)
Column Temperature: 40° C.
Eluent: tetrahydrofuran (THF)
Flow Rate: 1.0 mL/minute
Injection Amount: 100 µL (a tetrahydrofuran solution having a sample concentration of 0.4% by mass)
Standard samples: The following types of standard polystyrene were used to produce a calibration curve.
(Standard Polystyrene)
"TSKgel standard polystyrene A-500", manufactured by Tosoh Corporation
"TSKgel standard polystyrene A-1000", manufactured by Tosoh Corporation
"TSKgel standard polystyrene A-2500", manufactured by Tosoh Corporation
"TSKgel standard polystyrene A-5000", manufactured by Tosoh Corporation
"TSKgel standard polystyrene F-1", manufactured by Tosoh Corporation
"TSKgel standard polystyrene F-2", manufactured by Tosoh Corporation
"TSKgel standard polystyrene F-4", manufactured by Tosoh Corporation
"TSKgel standard polystyrene F-10", manufactured by Tosoh Corporation
"TSKgel standard polystyrene F-20", manufactured by Tosoh Corporation
"TSKgel standard polystyrene F-40", manufactured by Tosoh Corporation
"TSKgel standard polystyrene F-80", manufactured by Tosoh Corporation
"TSKgel standard polystyrene F-128", manufactured by Tosoh Corporation
"TSKgel standard polystyrene F-288", manufactured by Tosoh Corporation
"TSKgel standard polystyrene F-550", manufactured by Tosoh Corporation

[Method for Measuring Acid Value of Anionic Urethane Resin (X)]

The urethane resin composition obtained in each of Examples and Comparative Examples was dried, and 0.05 g to 0.5 g of dried and solidified resin particles were weighed into a 300-mL Erlenmeyer flask. Subsequently, approximately 80 mL of a solvent mixture of tetrahydrofuran and ion-exchanged water at a mass ratio [tetrahydrofuran/ion-exchanged water] of 80/20 was added, whereby a solution mixture was obtained.

Next, a phenolphthalein indicator was mixed with the solution mixture. Then, the resulting mixture was titrated with a 0.1-mol/L aqueous potassium hydroxide solution standardized in advance. The acid value (mgKOH/g) of the anionic urethane resin (X) was determined according to the following computational formula (1) by using the amount of the aqueous potassium hydroxide solution used for the titration.

$$\text{Computational formula } A=(B \times f \times 5.611)/S \qquad (1)$$

In formula (1), A is the acid value (mgKOH/g) of the solid content of the resin; B is the amount (mL) of the 0.1-mol/L aqueous potassium hydroxide solution used for the titration; f is the factor of the 0.1-mol/L aqueous potassium hydroxide solution; S is the mass (g) of the resin particles; and 5.611 is the formula weight of potassium hydroxide (56.11/10).

[Method for Evaluating Oleic-Acid Resistance]

100 parts by mass of each of the urethane resin compositions obtained in Examples and Comparative Examples, 1 part by mass of a thickener ("HYDRAN ASSISTER T10", manufactured by DIC Corporation), and 3 parts by mass of a polyisocyanate cross-linking agent ("HYDRAN ASSISTER C5", manufactured by DIC Corporation) were mixed. The resultant liquid mixture was applied onto a flat release paper sheet ("EK-100D", manufactured by LINTEC Corporation) so as to achieve a dry thickness of 30 µm, and dried at 70° C. for 2 minutes, then dried at 120° C. for 2 minutes, whereby a polyurethane film was obtained. Subsequently, the polyurethane film was cut into strip pieces each having a width of 5 mm and a length of 50 mm, and the resultant pieces were used as test specimens. Using a tensile tester ("Autograph AG-I", manufactured by Shimadzu Corporation), one of the test specimens was subjected to a tensile test under the conditions of a chuck distance of 40 mm, a tensile speed of 10 mm/second, and a temperature of 23° C., and thus, a stress at 100% elongation (100% modulus, hereinafter referred to as "100% M (1)") was measured.

Subsequently, another one of the test specimens was immersed in oleic acid at 23° C. for 24 hours. Then, the test specimen was taken out, and oleic acid attached to a surface of the test piece was wiped away. Then, a 100% modulus value (hereinafter referred to as "100% M (2)") was measured in the same manner as for the 100% M (1). The percentage of retention was calculated by dividing the 100% M (2) by the 100% M (1), and evaluated as follows.

"A": The percentage of retention was 50% or more.
"B": The percentage of retention was 30% or more and less than 50%.
"C": The percentage of retention was less than 30%.

[Method for Evaluating Low-temperature Flexibility]

100 parts by mass of a urethane dispersion ("HYDRAN CRS-1286", manufactured by DIC Corporation), 10 parts by mass of a black pigment ("DILAC HS-9530", manufactured by DIC Corporation), and 1 part by mass of a thickener ("HYDRAN ASSISTER T10", manufactured by DIC Corporation) were mixed. The resultant liquid mixture was applied onto a flat release paper sheet ("DN-TP-155T", manufactured by Ajinomoto Co., Inc.) so as to achieve a dry thickness of 30 µm, and dried at 70° C. for 2 minutes, then dried at 120° C. for 2 minutes, whereby a skin layer was obtained.

Subsequently, 100 parts by mass of each of the urethane resin compositions obtained in Examples and Comparative Examples, 1 part by mass of a thickener ("HYDRAN ASSISTER T10", manufactured by DIC Corporation), and 3 parts by mass of a polyisocyanate cross-linking agent ("HYDRAN ASSISTER C5", manufactured by DIC Corporation) were mixed. The resultant liquid mixture was applied onto the skin layer so as to achieve a dry thickness of 50 µm, and dried at 70° C. for 3 minutes. Immediately after the drying, a T/R raised fabric was laminated, and the resultant laminate was heat-treated at 120° C. for 2 minutes, and subsequently aged at 50° C. for 2 days, and then the release paper sheet was peeled off to obtain a synthetic leather.

The obtained synthetic leather was subjected to a flexibility test (at −10° C., 100 times per minute) using a flexometer ("flexometer equipped with cryostat" manufactured by YASUDA SEIKI SEISAKUSHO, LTD.), and the number of times of the test performed until a crack appeared in a surface of the synthetic leather was measured, and the low-temperature flexibility was evaluated as follows.

"A": 30,000 times or more
"B": 10,000 times or more and less than 30,000 times
"C": Less than 10,000 times

[Method for Measuring Peel Strength]

The peel strength of each of the synthetic leather prepared in the manner described in the "Method for Evaluating Low-temperature Flexibility" was measured using Shimadzu Autograph "AG-1" (manufactured by Shimadzu Corporation) under the conditions of a full scale of 5 kg and a head speed of 20 ram/min, and evaluated according to the following criteria.

"A": 1.0 kgf/cm or more
"B": 0.5 kgf/cm or more and less than 1.0 kgf/cm
"C": Less than 0.5 kgf/cm

TABLE 1

| | | Example 1 | Example 2 | Example 3 | Example 4 |
|---|---|---|---|---|---|
| Anionic urethane resin (X) | Type | (X-1) | (X-2) | (X-3) | (X-4) |
| | Polycarbonate polyol (a1) | Bio-PC | Bio-PC | Bio-PC | Bio-PC |
| | Polyisocyanate (b) | IPDI | IPDI | IPDI | IPDI |
| | Alkanolamine (c) | MEA | DEA | MEA | DEA |
| | Chain extender (e1) | PiP | PiP | PiP | PiP |
| | Molar ratio [(c)/(e1)] | 88/12 | 88/12 | 88/12 | 88/12 |
| | Acid value (KOHmg/g) | 10.3 | 10.3 | 3.6 | 3.6 |
| | Weight-average molecular weight | 30,000 | 25,000 | 35,000 | 35,000 |
| Oleic acid resistance evaluation | | A | A | A | A |
| Low-temperature flexibility evaluation | | A | A | A | A |
| Peel strength evaluation | | A | A | A | A |

TABLE 2

| | | Comparative Example 1 | Comparative Example 2 | Comparative Example 3 |
|---|---|---|---|---|
| Anionic urethane resin (X) | Type | (XR-1) | (XR-2) | (XR-3) |
| | Polycarbonate polyol (a1) | BiO-PC | Non-BiO-PC (1) | Non-BiO-PC (2) |
| | Polyisocyanate (b) | IPDI | IPDI | IPDI |
| | Alkanolamine (c) | | MEA | MEA |
| | Chain extender (e1) | PiP | PiP | PiP |
| | Molar ratio [(c)/(e1)] | 0 | 88/12 | 88/12 |
| | Acid value (KOHmg/g) | 10.3 | 10.3 | 9.2 |
| | Weight-average molecular weight | 150,000 | 70,000 | 110,000 |
| Oleic acid resistance evaluation | | B | C | B |
| Low-temperature flexibility evaluation | | C | B | B |
| Peel strength evaluation | | C | B | C |

It was found that the urethane resin compositions according to the present invention, which were produced using a biomass raw material, had high oleic-acid resistance, excellent low-temperature flexibility, and high peel strength.

In contrast, Comparative Example 1, which was an embodiment not using the alkanolamine (c), resulted in poor low-temperature flexibility and poor peel strength.

Comparative Examples 2 and 3, which were embodiments using petroleum-based polycarbonate polyols instead of the polycarbonate polyol (a1), resulted in poor oleic-acid resistance and poor peel strength.

The invention claimed is:

1. A urethane resin composition comprising:
    an anionic urethane resin (X); and
    water (Y),
    the anionic urethane resin (X) being produced using,
    a polyol (a) including a biomass-derived polycarbonate polyol (a1);
    a polyisocyanate (b); an alkanolamine (c); and
    a chain extender (e), wherein the chain extender (e) comprises a chain extender (e1) having two or more amino groups, an amount of the chain extender (e) is within a range of 0.001% to 0.1% by mass, based on a total mass of raw materials constituting the anionic urethane resin (X),
    wherein the biomass-derived polycarbonate polyol (a1) is produced using 1,4-butanediol and a biomass-derived decanediol as raw materials, and a molar ratio of 1,4-butanediol to the biomass-derived decanediol is within a range of 5/95 to 95/5, and
    wherein a molar equivalent ratio (c)/(e1) of the alkanolamine (c) to the chain extender (e1) is within a range of 80/20 to 97/3.

2. The urethane resin composition according to claim 1, wherein a number average molecular weight of the biomass-derived polycarbonate polyol (a1) is within a range of 1,500 to 2,500.

3. The urethane resin composition according to claim 1, wherein a weight-average molecular weight of the anionic urethane resin (X) is within a range of 10,000 to 70,000.

4. An adhesive comprising the urethane resin composition according to claim 1.

5. A synthetic leather comprising at least:
   a base fabric (i); and
   an adhesive layer (ii) formed from the adhesive according to claim 4.

* * * * *